(12) United States Patent
Gehring et al.

(10) Patent No.: US 6,689,403 B1
(45) Date of Patent: Feb. 10, 2004

(54) MIXTURE FOR REDDENING MEAT PRODUCTS

(75) Inventors: Udo Gehring, Markgroningen (DE); Helmut Pohnl, Bietigheim-Bissingen (DE)

(73) Assignee: Karl Muller GmbH & Co., Stuttgart (DE)

( * ) Notice: Subject to any disclaimer, the term of this patent is extended or adjusted under 35 U.S.C. 154(b) by 0 days.

(21) Appl. No.: 09/937,801

(22) PCT Filed: Mar. 18, 2000

(86) PCT No.: PCT/EP00/02421

§ 371 (c)(1),
(2), (4) Date: Feb. 1, 2002

(87) PCT Pub. No.: WO00/57728

PCT Pub. Date: Oct. 5, 2000

(30) Foreign Application Priority Data

Mar. 25, 1999 (DE) .......................... 119 13 437

(51) Int. Cl.$^7$ ........................................... A23L 1/318
(52) U.S. Cl. ............................. 426/56; 426/59; 426/61; 426/266; 426/270; 426/574
(58) Field of Search ........................... 426/56, 61, 262, 426/265, 58, 9, 270, 574, 652, 59, 266

(56) References Cited

U.S. PATENT DOCUMENTS

| 4,304,868 A | * | 12/1981 | Gryczka et al. | ............... 426/56 |
| 6,217,925 B1 | * | 4/2001 | Kim | ............................ 426/321 |

FOREIGN PATENT DOCUMENTS

| DE | 40 35 836 | * | 11/1990 |
| EP | 0 244 663 | * | 4/1987 |
| EP | 0 253 158 | * | 6/1987 |
| GB | 2 243 528 | * | 11/1991 |

OTHER PUBLICATIONS

Babic et al. "Growth of Listeria monocytogenes restricted by native microorganisms and other properties of fresh–cut spinach", Journal of Food Protection, 60(8):912–917, Aug. 1997 (abstract only).*

* cited by examiner

*Primary Examiner*—Keith Hendricks
(74) *Attorney, Agent, or Firm*—Fulbright & Jaworski L.L.P.

(57) ABSTRACT

The invention relates to a mixture for reddening meat products, notably sausages cooked in water, which for each 1 kg of meat or sausage meat contains between $1 \times 10^8$ and $5 \times 10^{10}$ germs of a nitrate-reducing microorganism suitable for use in food products, as well as between 10 and 2000 g, in relation to fresh weight, of a vegetable product with a nature nitrate content of between 100 and 500 mg/kg.

14 Claims, No Drawings

MIXTURE FOR REDDENING MEAT PRODUCTS

This application is a 371 National Stage of PCT/EP00/02421, filed Mar. 18, 2000.

The invention relates to a reddening mixture for covering meat products, especially boiling sausages, by adding plant products, in particular vegetable products, and nitrate-reducing microorganisms.

The reddening of meat products is attributable to the use of nitrate and/or salt of nitrous acid for brining purposes that may be added in quantities of maximum 150 mg/kg of raw sausage meat. The reddening of boiling sausages with the help of microorganisms, as used in meat production, has not been customary up to now, particularly because the heating carried out immediately after the production process, according to traditional technology, does not permit an adequate metabolic performance of microorganisms.

Since food additives of natural origin increasingly enjoy greater consumer trust than traditional additives, it is deemed desirable to have available a reddening substance and a process that utilizes the natural nitrate content of foodstuff. Such agent and process would have to lead in a controllable and reproducible manner and by methods that comply with the food law to a nitrite content in the respectively treated meat product that is within statutory restrictions.

This objective is reached by making available a reddening mixture for meat products, especially for boiling sausages, that contains, related to 1 kg of meat or sausage preparation, $1 \times 10^8$ to $5 \times 10^{10}$ cells of a nitrate-reducing microorganism, useable for foodstuff, and 10 to 2000 g, related to fresh weight, of a plant product having a natural nitrate content of 100 to 5000 mg/kg. The microorganisms and the vegetable product may be present, respectively, in dried form. When using dried microorganisms, their activity must be supported by rehydration and, if necessary, by appropriate combinations of nutrients.

The reddening mixture, according to the invention, is meant for meat products, particularly for boiling sausages, and is optimized for this purpose. Said mixture contains, in the above-mentioned quantity, germs of a nitrate-reducing microorganism, useable for foodstuff, as well as a vegetable product with a permissible, natural nitrate content. Both components may be present in dried form of which the microorganism would preferably be in a freeze-dried form.

Meat products are deemed all foodstuff that contains meat, even including those foods that do not contain the minimum legally stipulated meat content. These are, in particular, raw pickled meat, cooked pickled meat, raw sausages and boiled sausages.

The microorganisms concerned are those that have been introduced to and are customarily used in food technology. These are, in particular, nitrate-reducing microorganisms of the following genera: staphylococcus, micrococcus, halomonas and paracoccus. They are especially germs with a nitrate reductase and thus are able to provide the required nitrite from the nitrate of the vegetable products Nitrite is the basis for the formation of nitric oxide that is required for the reddening.

Naturally, also insulated nitrate-reductase can be used instead of live microorganism. Nitrate-reducing enzyme systems are known to science and may likewise be used without a doubt for inventive purposes.

Especially preferred are microorganisms of the *S. carnosus*, *S. xylosus* and *S. equorum* species, as well as *Kocuria varians*, which are already used for the reddening of meat products. A particularly preferred culture is the customary *Staphylococcus carnosus utilis* strain. In addition, a number of nitrate-reducing halomonas species are known that have proven to be usable in foodstuff.

Basically any vegetable products that have a nitrate content of 100 to 5000 mg/kg, especially 1,000 to 2,500 mg/kg in the fresh state, as required according to the invention, can be used as plant products. These include, aside from the actual vegetable product itself, also vegetable extracts and juices and, if necessary, in an enzymatic or microbially fermented form, as well as such products in a dried form.

Preferable vegetable products within the meaning of the invention are various forms of lettuces, especially head lettuce, lamb's lettuce, iceberg lettuce, as well as Chinese cabbage, spinach, beetroot or celery. According to current regulations, consumable head lettuce may contain up to 2,500 mg/kg of nitrate in the summer and up to 3,500 mg/kg in the winter. Beetroot may contain up to 5,000 mg/kg of nitrate. It is also possible to use mixtures of various vegetables. As regards to neutrality of flavour, types of lettuce are given preference. It is understood, of course, that the addition of plant products can entail further effects as, for example, in the realm of flavour and colouring.

The reddening mixture, according to the invention, may also contain other preferable additives in addition to the above-mentioned components such as, for example, a mixture of spices as required for the production of the respective meat products, as well as a reactivating mixture for the microorganism. It may be appropriate to keep the microorganism, reactivating mixture and/or the spice mixture/vegetable product separate from one another.

The reddening mixture, according to the invention, may contain, for example, as a marketable package, the individual components in the quantities required for the preparation of 25, 50, 100 and 200 kg of meat or sausages.

Furthermore, the invention relates to a reddening process of meat products, especially boiling sausages, according to which one adds to a seasoned but nitrite-free meat or sausage preparation nitrate-reducing microorganism, useable as foodstuff, in quantities of $1 \times 10^8$ up to $5 \times 10^{10}$ germs/kg of mass, in combination with a plant product having a natural nitrate content of 100 to 5,000 mg/kg of fresh product in a quantity of 10 to 2,000 g per kg of meat or sausage preparation, related to the fresh weight of the plant product. The meat products are then allowed to rest/ripen for 6 to 72 hours and are subsequently heated.

The microorganisms and the vegetable product thus fulfill the aforementioned criteria for the reddening mixture. The vegetable product is added to the prepared meat or sausage preparation in such quantity that, in particular, a nitrate content of 10 to 300 mg/kg of mass results.

It is understood, of course, that when using nitrate-containing drinking water in the production of the meat product, such nitrate content can likewise be taken into consideration and utilized for inventive purposes. The nitrate content in drinking water may not exceed 50 ppm.

When microorganisms are used as a dry product, it is appropriate to rehydrate or reactivate them prior to use. They can be rehydrated, for example, in tap water or in a familiar rehydration medium. To reactivate them, liquid media, enriched with minerals as well as with nitrogen and carbon sources, are appropriately used, and the microorganisms are allowed to rest in such media for a defined period of about 6 to 72 hours, especially 12 to 24 hours.

The use of dried, especially freeze-dried microorganisms, following rehydration or reactivation, is preferred for the process according to the invention. This applies likewise to the use of the plant product as a dried product.

The meat product produced, according to the invention, appropriately ripens over a period of 10 to 48 hours at a temperature of 5 to 12° C. This is subsequently followed by heating preferably to a core temperature of 68 to 72°, especially if it concerns boiling sausages.

The invention relates ultimately to a meat product obtained from a seasoned but nitrite-free meat or sausage preparation, by using nitrate-reducing microorganisms, useable in foodstuff, in quantities of $1 \times 10^8$ up to $5 \times 10^{10}$ germs/kg of meat or sausage preparation, in combination with a plant product having a natural nitrate content of 100 to 5,000 mg/kg, in a quantity of 10 to 2,000 g per kg of meat or sausage preparation, related to the fresh weight of the plant product.

The invention is explained in greater detail by the example, as set out below.

EXAMPLE

A boiling sausage mass was produced, according to GEHA classification, from 20 kg of R II, 22 kg of S II, 20 kg of S VI, 20 kg of S VII, as well as 18 kg of ice, 18.0 g of table salt, 4.0 g of mixed spices, 0.5 g of sodium ascorbate (as reddening adjuvant), 0.4 g sodium diphosphate and 50.0 g of a fresh vegetable mixture, consisting of beetroot, spinach, celery and lettuces, having a nitrate content of 1,000 ppm, were used per kg of total mass.

A customary freeze-dried *staphylococcus carnosus utilis* with a sowing density of $1.0 \times 10^7$ germs/g of boiling sausage mass was used as starter culture.

Prior to preparing the mass of boiling sausage, the starter culture was rehydrated for 12 hours at 25° in a customary rehydrating mixture with a nitrogen source, a carbon source and minerals.

To produce the boiling sausage mass lean meat and fatty tissue were put separately through a 3 to 4 mm meat-grinding disk. The lean meat was then chopped in the cutter by adding the prepared and cut-up vegetable mixture and the rehydrated starter culture. Salt, spices, chopping adjuvants, reddening additives and about 30% of the ice were then added and cut up further to produce a good mixture.

The ground, fatty material was then added to the mass at a temperature of 4 to 6° C., and the cutter was allowed to operate further up to 12 to 14° C. The remaining ice was subsequently added and cut at high speed up to about 10° C. The processing of the sausage mass was subsequently finalized at slow speed to 10 up to 12° C.

The mass was subsequently filled into sausage casings and allowed to hang for 18 hours at 5° C. Afterwards, the sausages were boiled at 76° C. up to a core temperature of 68 to 72° C. After cooling in water, the resulting product corresponded in every respect, i.e. in appearance and in taste, to a customary boiling sausage.

What is claimed is:

1. A process to redden meat products, comprising the steps of adding to a seasoned but nitrite-free meat or sausage preparation, a nitrate-reducing microorganism of the genus Staphylococcus, Micrococcus, Halomonas or Paracoccus that can be safely used in foodstuff, in a quantity of $1 \times 10^8$ to $5 \times 10^{10}$ cells per kg, in combination with a vegetable product having a natural nitrate content of 100 to 5,000 mg/kg, and a quantity of 10 to 2,000 g/kg of vegetable product based on its fresh weight, wherein the meat product is ripened or rests for 6 to 72 hours.

2. A process, according to claim 1, wherein the vegetable product is added as a dried product.

3. A process, according to claim 1, wherein said natural nitrate content of the vegetable product is 1,000 to 3,500 mg/kg.

4. A process, according to claim 1, wherein the vegetable product is added in a quantity that results in a nitrate content of 10 to 300 mg/kg of meat or sausage preparation.

5. A process, according to claim 1, wherein said vegetable product is selected from the group consisting of lamb's lettuce, head lettuce, Chinese cabbage, iceberg lettuce, spinach, beetroot and celery.

6. A process according to claim 1, wherein a strain selected from the group consisting of species *S. carnosus, S. xylosus, S. equorum* and *Kocuria varians* is used as said microorganism.

7. A process, according to claim 1, wherein said microorganism is initially in a dried state and are rehydrated or reactivated before being added to the meat or sausage.

8. A process, according to claim 1, wherein the meat product is ripened or rests for 10 to 48 hours at 2 to 20° C.

9. A process, according to claim 1, wherein the ripened or rested meat or sausage preparation is heated to a core temperature of >62C.

10. A meat product obtained by adding a nitrate-reducing microorganism of the genus Staphylococcus, Micrococcus, Halomonas or Paracoccus that can be safely used in foodstuff to a seasoned meat or sausage preparation that has been made nitrite free, in a quantity of $1 \times 10^8$ to $5 \times 10^{10}$ cells per kg of meat or sausage preparation, in combination with a vegetable product having a natural nitrate content of 100 to 5,000 mg/kg, in a quantity of 10 to 2,000 g/kg of meat or sausage mass, based on the fresh weight of the vegetable product.

11. The meat product of claim 10 comprising a boiling sausage.

12. The reddening mixture of claim 1 wherein said meat product is boiling sausage.

13. The process of claim 1 including heating the meat product subsequent to the step of ripening or resting.

14. The process of claim 6 wherein said microorganism is *S. carnosus utilis*.

* * * * *